United States Patent
Refsdal et al.

(10) Patent No.: US 11,176,824 B2
(45) Date of Patent: Nov. 16, 2021

(54) IDENTIFICATION AND PERFORMANCE OF AN ACTION RELATED TO A POORLY PARKED VEHICLE

(71) Applicant: Verizon Patent and Licensing Inc., Arlington, VA (US)

(72) Inventors: Brian Refsdal, Menlo Park, CA (US); Nick G. Suizo, San Jose, CA (US); Kent Ryhorchuk, Menlo Park, CA (US); Tibor Gyimesi, Berkeley, CA (US); Andrew W. Herson, Albany, CA (US); Istvan Horvath, Budapest (HU)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 428 days.

(21) Appl. No.: 16/224,052

(22) Filed: Dec. 18, 2018

(65) Prior Publication Data
US 2020/0193827 A1 Jun. 18, 2020

(51) Int. Cl.
*G08G 1/14* (2006.01)
*B60W 30/06* (2006.01)
*G08G 1/017* (2006.01)
*G06K 9/00* (2006.01)

(52) U.S. Cl.
CPC ......... *G08G 1/146* (2013.01); *G06K 9/00812* (2013.01); *G06K 9/00825* (2013.01); *G08G 1/017* (2013.01); *G08G 1/142* (2013.01)

(58) Field of Classification Search
None
See application file for complete search history.

(56) References Cited

U.S. PATENT DOCUMENTS

| | | | | |
|---|---|---|---|---|
| 2015/0019267 A1* | 1/2015 | Prieto | .................. | G06Q 10/067 705/4 |
| 2015/0039173 A1* | 2/2015 | Beaurepaire | ....... | B62D 15/0285 701/23 |

* cited by examiner

*Primary Examiner* — John F Mortell

(57) ABSTRACT

A device can receive parking metadata that includes location data indicating that a portion of a vehicle is located outside of a designated parking area (DPA). The device can process the parking metadata to identify values that are to be used when determining actions to perform. The device can obtain supplemental events data associated with events occurring near the DPA. The device can determine the actions to perform based on the parking metadata and the supplemental events data. The device can provide, as one of the actions and to one or more other devices or to the vehicle, a message indicating that the portion of the vehicle is located outside of the DPA. This can cause the one or more other devices or the vehicle to: move the vehicle from the DPA, reposition the vehicle within the DPA, or penalize an owner of the vehicle.

20 Claims, 6 Drawing Sheets

IDENTIFICATION AND PERFORMANCE OF AN ACTION RELATED TO A POORLY PARKED VEHICLE

BACKGROUND

Parking is the act of stopping and disengaging a vehicle and leaving the vehicle unoccupied. A vehicle can be parked in a parking garage, in a parking lot, on a road in a designated parking spot, and/or the like. Geolocation involves the identification or estimation of a real-world geographic location of an object (e.g., a vehicle).

DETAILED DESCRIPTION OF PREFERRED EMBODIMENTS

Figure 1A:
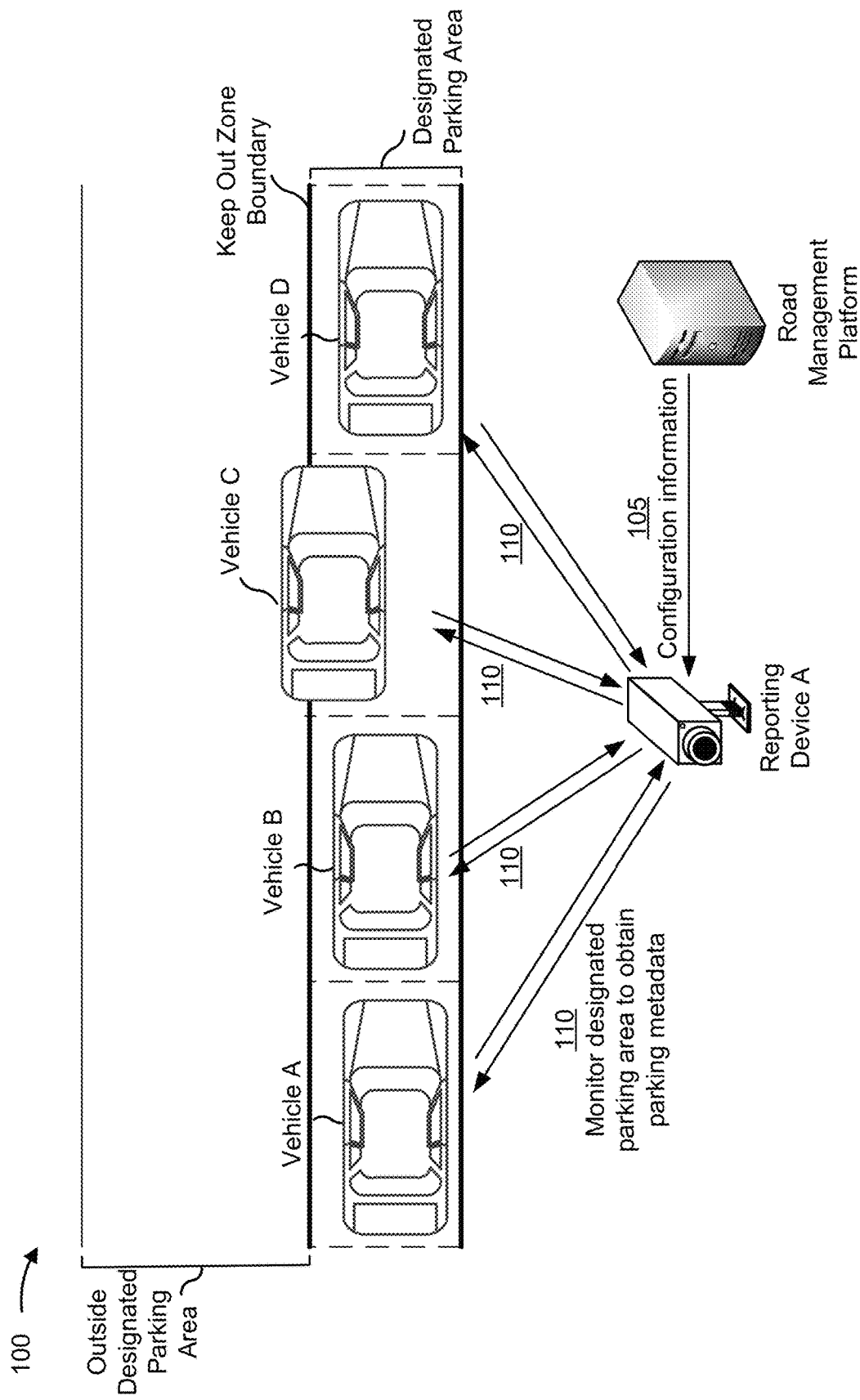
FIGS. 1A-1C are diagrams of an example implementation described herein.

The following detailed description of example implementations refers to the accompanying drawings. The same reference numbers in different drawings can identify the same or similar elements.

A vehicle can be parked in a parking garage, in a parking lot, on a road in a designated parking space, and/or the like. In some cases, a road with designated parking spots can also include a bicycle lane, an area for a tram, and/or the like. To fit spaces for multiple lanes of traffic, a bicycle lane, an area for a tram, a bus lane, and/or the like, a space reserved for the designated parking spaces might need to be reduced in size.

However, using the road for too many activities and/or reducing the size of the designated parking spaces causes safety concerns. For example, if a vehicle is poorly parked in a designated parking space that has a reduced size (e.g., to provide space for road traffic, a tram, a bicycle path, a bus, and/or the like), the vehicle might encroach on a part of the road that is reserved for other vehicles (e.g., a part of the road reserved for ordinary traffic, a bicycle, a tram, a bus, and/or the like). This increases a chance of accidents on the road, causes traffic congestion, and/or the like.

Some implementations described herein provide a road management platform to receive parking metadata indicating that a vehicle is poorly parked in a designated parking area and to perform actions to ensure that the vehicle does not interfere with traffic near the designated parking area and/or actions to penalize an owner (or a driver) for poorly parking the vehicle. For example, the road management platform can receive parking metadata for a vehicle that is located at least partially within a designated parking area. The parking metadata can include location data indicating that part of the vehicle is located outside of the designated parking area. Additionally, the road management platform can obtain supplemental events data associated with one or more events occurring near the designated parking data (e.g., scheduling data for a tram or bus, traffic data associated with a bicycle lane, and/or the like).

In some implementations, the road management platform can determine a first group of actions that are to be performed based on the parking metadata and the supplemental events data. For example, the road management platform can be configured with a list of actions that ensure that the vehicle does not obstruct traffic near the designated parking area and/or that penalize an owner (or a driver) for poorly parking the vehicle. In this case, the road management platform can intelligently determine to perform the first group of actions, of the list of actions, based on values included in the parking metadata and/or the supplemental events data. Additionally, the road management platform, as part of performing the first group of actions, can generate and provide a message to one or more other devices or to the vehicle indicating that part of the vehicle is located outside of the designated parking area. This can cause the one or more other devices to perform a second group of actions to move the vehicle from the designated parking area, reposition the vehicle to be appropriately parked within the designated parking area, penalize the owner (or the driver) for poorly parking the vehicle, and/or the like.

By performing the first group of actions, the road management platform ensures that the vehicle does not interfere or obstruct traffic near the designated parking area, thereby reducing accidents, reducing traffic congestion, and/or the like. This conserves resources (e.g., processing resources, network resources, and/or the like) of first responder devices used to provide assistance during an accident, conserves fuel by reducing the traffic congestion, and/or the like. Furthermore, penalizing the owner (or the driver) for poorly parking the vehicle reduces future accidents and/or traffic congestion by creating a deterrent that causes subsequent drivers to correctly park their vehicles in the designated parking area (e.g., or else receive a ticket or be towed).

Furthermore, several different stages of the process for ensuring that a parked vehicle does not interfere with traffic near the designated parking area are automated, which removes human subjectivity and waste from the process, and which improves speed and efficiency of the process and conserves computing resources (e.g., processor resources, memory resources, and/or the like). For example, by automating the process for identifying whether the vehicle is appropriately parked within the designated parking area, and further automating the process for performing actions to ensure that the vehicle does not interfere with traffic near the designated parking area, the road management platform conserves computing resources relative to an inferior device or platform that has to be used in conjunction with manual assistance. Additionally, implementations described herein use a rigorous, computerized process to perform tasks or roles that were not previously performed or were previously performed using subjective human intuition or input.

Figure 1B:
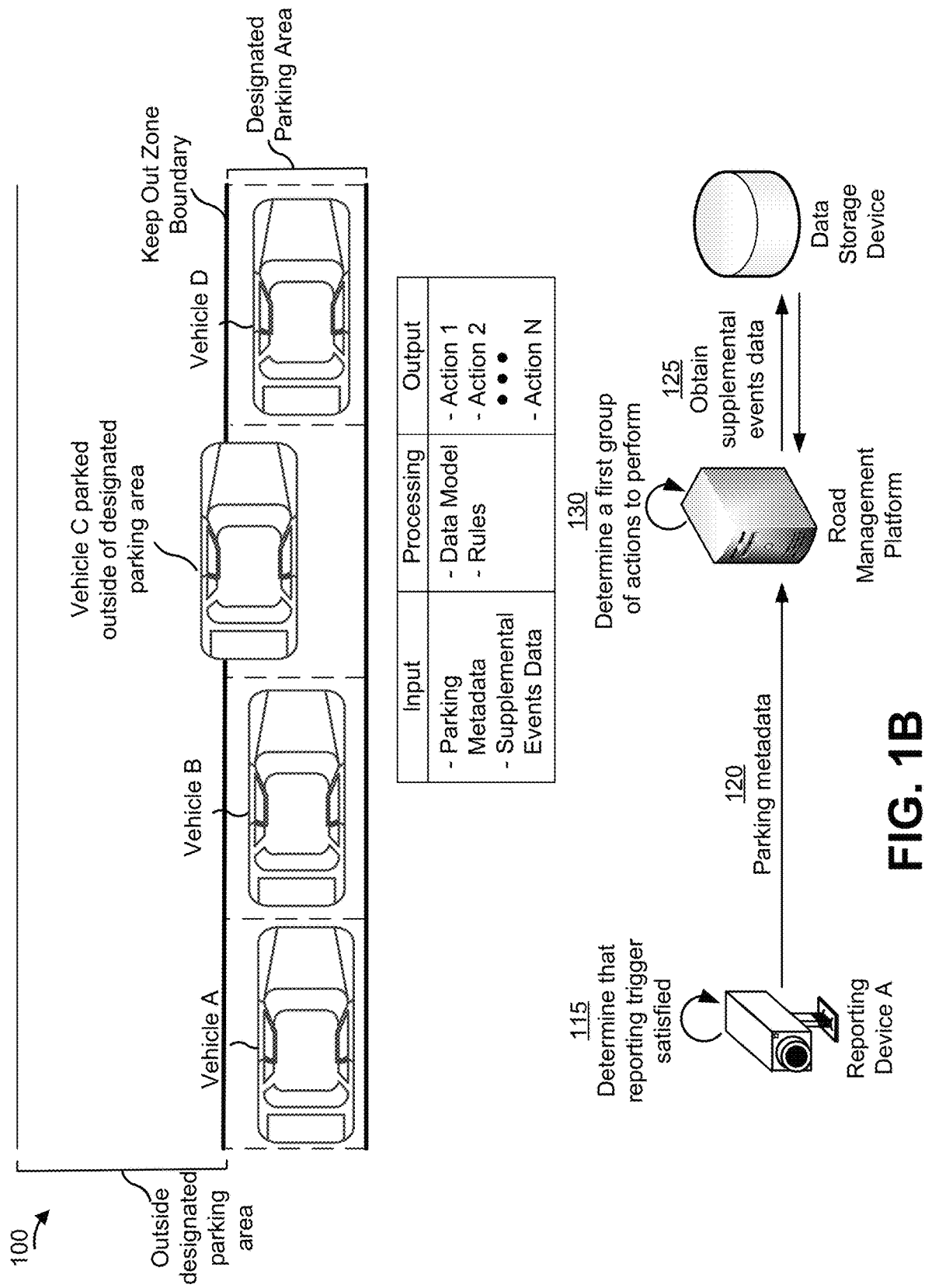
Figure 1C:
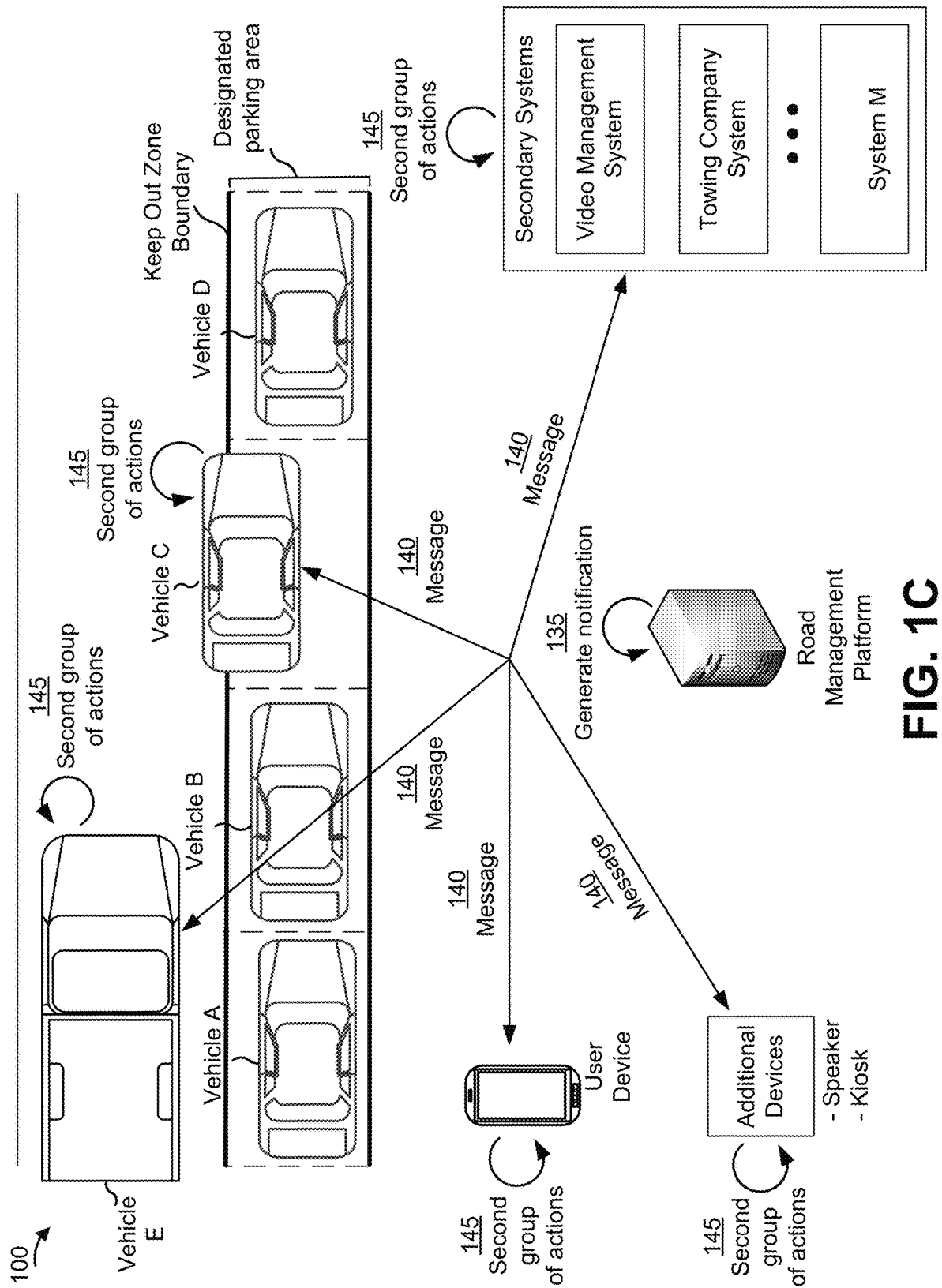

FIGS. 1A-1C are diagrams of an example implementation 100 described herein. For example, example implementation 100 can include a reporting device (shown as Reporting Device A), a group of parked vehicles (shown as Vehicle A, Vehicle B, Vehicle C, and Vehicle D), a road management platform, a data storage device, a moving vehicle (shown as Vehicle E), a user device, a group of secondary systems (shown as a Video Management System, a Towing Company System, . . . , System M), and a group of additional devices (e.g., a speaker, a kiosk, and/or the like). While implementations described herein show a single reporting device, it is to be understood that this is provided by way of example. In practice, the road management platform can interact with one or more sets of reporting devices that are able to monitor any number of different designated parking areas.

As shown in FIG. 1A, and by reference number 105, the road management platform can provide configuration information to the reporting device. For example, the reporting device can be tasked with monitoring a designated parking area and can be configured using configuration information that allows the reporting device to monitor the designated parking area to determine whether a vehicle is improperly parked.

The configuration information can include a parking area identifier for the designated parking area, information identifying a set of geographic coordinates that define boundaries of the designated parking area, information identifying a particular boundary of the designated parking area as a boundary that a vehicle is not permitted to encroach or park over (shown as a keep out zone boundary), information identifying additional sets of geographic coordinates that define specific areas (e.g., parking spaces) within the designated parking area (shown by vertical dotted lines), one or more identifiers for the specific areas, a threshold reporting value indicating when to report a vehicle for improper parking (e.g., when the vehicle encroaches or parks over the keep out zone boundary, when the vehicle encroaches or parks over the keep out zone boundary by a threshold distance, etc.), and/or the like. By configuring the reporting device with the configuration information and one or more features capable of detecting a vehicle within the designated parking area, the reporting device can determine whether the vehicle is appropriately parked within the designated parking area, as described further herein.

In some implementations, the road management platform can configure the reporting device using configuration information that is input via an interface. For example, a user can interact with an interface (e.g., a program interface, a web interface, and/or the like) of a user device (e.g., a desktop computer, a mobile device, and/or the like) to input the configuration information. In this case, the interface can display a map that includes the designated parking area, and the user can input the configuration information into fields of the interface. For example, the user can add boundaries of the designated parking area to the map, such as by drawing a line with a mouse cursor, by inputting geographic coordinates of the line, and/or the like. Additionally, the user can select one of the boundaries as the particular boundary identifying the area that a vehicle is not permitted to encroach or park over (e.g., the keep out zone boundary), can select a threshold reporting value, and/or the like. When the user finishes inputting the configuration information (e.g., by selecting a complete or send button), the configuration information can be provided to the road management platform which can provide the configuration information to the reporting device.

In some implementations, the boundaries of the designed parking area can be pre-configured, and the user can simply add a boundary identifying the area that the vehicle is not permitted to encroach or park over. In some implementations, a device other than the road management platform can configure the reporting device.

In the example shown in FIG. 1A, a road can have a designated parking area located on a side of the road. In this example, a user might interact with an interface to add two boundaries of the designated parking area (shown as two straight lines). One of the boundaries (shown as the keep out zone boundary) can identify an area that vehicles are not permitted to encroach or park over (e.g., an area closest to the remainder of the road). Additionally, the user can configure a threshold reporting value which might identify a distance that, if encroached or parked over by a vehicle, would trigger the reporting device to provide parking metadata to the road management platform.

As shown by reference number 110, the reporting device can monitor the designated parking area to obtain parking metadata. For example, the reporting device can monitor the designated parking area by recording a video of the designated parking area, by periodically taking images of the designated parking area, and/or the like.

The parking metadata can include identification data, location data, time data, and/or the like. The identification data can include an identifier of the designated parking area, an identifier of a specific area (e.g., a parking space) within the designated parking area, an object identifier for a type of object within the designated parking area (e.g., an identifier for a vehicle, motorcycle, etc.), and/or the like. The location data can include data identifying a set of geographic coordinates of the designated parking area (e.g., geographic coordinates defining the keep out zone boundary), data identifying a set of geographic coordinates of the specific parking area within the designated parking area (e.g., the parking space), data identifying a set of geographic coordinates of an object (e.g., a vehicle) that is at least partially inside of the designated parking area, data identifying a set of geographic coordinates of a portion of the object that is outside of the designated parking area, and/or the like. As described herein, a set of geographic coordinates can refer to one or more groups of coordinates that include a latitudinal coordinate, a longitudinal coordinate, an altitudinal coordinate, and/or the like. The time data can include data identifying a time at which a vehicle is identified as being located at least partially within the designated parking area.

In some cases, the reporting device can be configured to capture location data identifying a set of geographic coordinates of a portion of the vehicle that is outside of the designated parking area. In other cases, the reporting device can determine that a portion of the vehicle is outside of the designated parking area. For example, the reporting device can compare location data identifying a set of geographic coordinates of the designated parking area and location data identifying a set of geographic coordinates of a vehicle to determine location data identifying a set of geographic coordinates of the portion of the vehicle that is outside of the designated parking area.

In some implementations, the reporting device can obtain parking metadata by recording a video of the designated parking area. For example, the reporting device can record a video of the designated parking area, which can create a multimedia file of the video. In this case, the reporting device can convert the multimedia file to a set of image files and can process the image files to generate parking metadata based on contents of the set of image files.

Additionally, or alternatively, the reporting device can periodically capture images of the designated parking area. For example, the reporting device can periodically capture images of the designated parking area and can process image files to generate parking metadata based on contents of the image files, as described above. In this way, the reporting device conserves processing resources and/or storage resources relative to recording a video of the designated parking area.

In some implementations, the reporting device can obtain parking metadata that satisfies a threshold level of accuracy. For example, the reporting device can monitor the designated parking area to detect a three-dimensional (3-D) object (e.g., a vehicle) that is geolocated within the designated parking area, whereby the location data identifying a set of geographic coordinates of the vehicle can satisfy a threshold level of accuracy. As an example, the reporting device can generate location data that is within at least 30 centimeters of an actual location of the vehicle. By receiving parking metadata that satisfies the threshold level of accuracy, the road management platform is able to process the parking metadata and make intelligent decisions regarding preforming particular actions that ensure that the vehicle does not interfere with traffic near the designated parking area, as described further herein.

Additionally, or alternatively, another device can obtain the parking metadata. For example, another type of sensor, a vehicle on the road, a user device on or near the road, and/or the like, can obtain the parking metadata, in a manner similar to that described above. As a particular example, a vehicle (e.g., an autonomous vehicle or a partially autonomous vehicle capable of self-parking) can generate parking metadata when the vehicle parks and can provide the parking metadata to the road management platform for further processing.

In some implementations, the reporting device can store the parking metadata. For example, the reporting device can store the parking metadata using a data structure, such as a linked-list, an array, a database (e.g., a relational database), a tree, a hash table, and/or the like. In some implementations, the reporting device can store the parking metadata for a particular time period and can remove (i.e., delete) the parking metadata after the particular time period.

In this way, the reporting device monitors and obtains parking metadata that can be used for further processing, as described herein.

As shown in FIG. 1B, and by reference number 115, the reporting device can determine that a reporting trigger is satisfied. For example, the reporting device can be configured to determine whether a reporting trigger that, if satisfied, can cause the reporting device to provide the parking metadata to the road management platform. The reporting trigger can be one or more threshold values that represent an area in which a vehicle is not permitted to be positioned or not permitted to encroach or park over, a time period, an occurrence of a non-zero value (e.g., to report parking metadata every time that parking metadata is obtained and a vehicle is present), and/or the like.

As an example, assume the reporting trigger is satisfied if a position of the vehicle encroaches or is parked over the geographic coordinates of the keep out zone boundary. In this example, the reporting device can obtain parking metadata that includes location data identifying geographic coordinates of the vehicle and can compare the location data of the vehicle to location data identifying the geographic coordinates of the keep out zone boundary to determine that the reporting trigger is satisfied.

As shown by reference number 120, the reporting device can provide the parking metadata to the road management platform. For example, the reporting device can provide the parking metadata based on the reporting trigger being satisfied. In this case, the reporting device can provide the parking metadata to the road management platform using a communication interface, such as an application programming interface (API), an interface supported by an internet of things (IoT) protocol, and/or the like.

As shown by reference number 125, the road management platform can obtain supplemental events data. For example, the road management platform can obtain supplemental events data periodically over time based on receiving the parking metadata from the reporting device and/or a similar type of trigger.

The supplemental events data can include scheduling data identifying a location of a transit vehicle (i.e., a vehicle that is part of a transit service, such as a bus, a tram, and/or the like) that runs adjacent to the designated parking area, traffic data identifying traffic in a bicycle lane or a roadway that is adjacent to the designated parking area, weather data identifying a weather condition in a vicinity of the designated parking area, and/or the like. The supplemental events data can be used to determine a first group of actions to perform, as further described below.

In some implementations, the road management platform can obtain the scheduling data identifying the location of the transit vehicle. For example, the road management platform can use a data mining technique to analyze a website and obtain the scheduling data. In this case, the road management platform can use a natural language processing technique to further process the scheduling data to identify a first value that represents a current time and a second value that represents a location of the transit vehicle.

In some cases, the scheduling data might represent a tentative schedule and might not identify an actual position of the transit vehicle. In this case, the road management platform can use the data mining technique to analyze a different website to obtain map data identifying a real-time image of an area that includes the designated parking area. Additionally, the road management platform can process the map data to identify an actual position of the transit vehicle.

Additionally, or alternatively, the road management platform can obtain the traffic data identifying the traffic in the bicycle lane or the roadway that is adjacent to the designated parking area. For example, the road management platform can obtain the traffic data in a manner similar to that described above (e.g., using the data mining technique). The traffic data can identify a volume of traffic in the bicycle lane, a volume of traffic in the roadway, and/or the like.

Additionally, or alternatively, the road management platform can obtain the weather data identifying the weather condition near the designated parking area. For example, the road management platform can obtain the weather data in a manner similar to that described above (e.g., using the data mining technique). The weather data can identify a temperature, a presence of rain, snow, thunder, lightning, and/or the like.

As shown by reference number 130, the road management platform can determine to perform a first group of actions. For example, the road management platform can be configured to perform a list of actions and can select a first group of actions to perform, from the list of actions, based on values included in the parking metadata and/or the supplemental events data.

The list of actions can include a first action to generate a message indicating that a portion of the vehicle is located outside of the designated parking area, a second action to provide the message to one or more other devices, a third action to update a data stream that provides a client organization with access to a real-time feed of the designated parking area, and/or the like. In some implementations, the message that is to be generated as the second action can include geographic coordinates identifying a degree to which the vehicle has encroached or parked over a boundary of the designated parking area (e.g., the keep out zone boundary).

Additionally, or alternatively, the message can include instructions that recommend or enable other devices to perform a second group of actions. In this case, the road management platform can generate the instructions that are part of the message and can select the other devices that are to be recipients of the message (e.g., based on the values included in the parking metadata and/or the supplemental events data). The message can include a first set of instructions to move the vehicle from the designated parking area, a second set of instructions to reposition the vehicle to be appropriately parked within the designated parking area, a third set of instructions to modify a speed or a route of a transit vehicle that is expected to travel adjacent to the designated parking area to assist the transit vehicle in avoiding a collision with the vehicle, a fourth set of instructions to penalize an owner of the vehicle for improperly parking the vehicle within the designated parking area (e.g., by issuing a parking ticket, by towing the vehicle, etc.), a fifth set of instructions to display or project a message indicating that the vehicle has to be moved from the designated parking area or repositioned within the designated parking area, and/or the like.

In some implementations, the road management platform can use machine learning to determine the first group of actions to perform. For example, the road management platform can train a data model on historical data (e.g., historical parking metadata, historical supplemental events data, and/or the like) and by using one or more machine learning techniques to allow the data model to output a set of values that can be used to score (e.g., rank) the list of actions.

The following example illustrates a manner in which the data model might have been trained. For example, to train the data model, the road management platform can standardize and/or cleanse the historical data to transform the historical data into a format that is capable of being used by the data model. As an example, the historical data can include text values, integer values, and/or the like, and the road management platform can convert all (or some) values to a uniform data type and/or file format, such that historical data can be used to train the data model.

Continuing with the example, the road management platform can determine a set of features that are capable of being used to train the data model. For example, the road management platform can determine a set of features by providing the historical data to a subject matter expert and/or by using a feature determination technique. The set of features can serve as indicators of whether an action is more, or less, likely to be a preferred action to perform. The feature determination technique can include a trend variable analysis, a composite indicators analysis, a clustering analysis, a regression analysis, a statistical model (e.g., a general linear model), an analysis using a neural network, and/or the like.

To provide a few examples, the road management platform can use the feature determination technique to process the historical data to determine that a distance between a vehicle that is partially inside of the designated parking area and another vehicle (e.g., a tram, a bus, and/or the like) serves as an indicator of whether to perform a particular action. For example, as the distance between the vehicle and the transit vehicle is reduced, and a collision becomes more imminent, an action to alert the transit vehicle to stop or to slow down becomes more important because the action might be necessary to avoid a collision.

As another example, the road management platform can use the feature determination technique to process the historical data to determine that a degree to which the vehicle is outside of the designated parking area can serve as an indicator of whether to perform a first action or a second action. For example, if a vehicle is parked slightly outside of the designated parking area, but would not cause a collision with the tram, a first action to ticket a driver or owner of the vehicle might be preferred to an action to tow the vehicle or to alert a conductor of the tram.

As another example, the road management platform can use the feature determination technique to process the historical data to determine that an indicator of whether the vehicle is an autonomous vehicle capable of communicating with the road management platform might serve as an indicator of whether to perform a first action or a second action. For example, if the vehicle is an autonomous vehicle capable of communicating with the road management platform, a first action to provide the vehicle with instructions to automatically re-park might be preferred to a second action instructing a tow truck to remove the vehicle from the designated parking area.

As another example, the road management platform can use the feature determination technique to process the historical data to determine whether the vehicle is parked over a boundary adjacent to the designated parking area (e.g., the keep out zone boundary) or is parked over a boundary perpendicular to the designated parking area (e.g., over one of the dotted lines signifying a boundary between two parking spaces) and might use this information as an indicator of whether to perform a first action or a second action. For example, if a vehicle is parked over the keep out zone boundary, a first action to tow the vehicle or alert a tram might be preferred over a second action to issue a parking ticket. Conversely, the second action to issue the parking ticket might be preferred over the first action if the vehicle is simply parked over the boundary perpendicular to the designated parking area (e.g., the dotted line).

The features described above are provided by way of example. In practice, the road management platform can determine tens, hundreds, thousands, or more, of features that can be used to determine which actions to perform.

In some implementations, the road management platform can use the data model to determine the first group of actions to perform. For example, the road management platform can provide the parking metadata and/or the supplemental events data as input to the data model to cause the data model to output a set of values (e.g., scores) that are associated with the list of actions. In this case, the road management platform can identify one or more values, of the set of values, that satisfy a threshold confidence level. The one or more values can be stored in association with identifiers of actions that can be used as the first group of actions to perform. Furthermore, the road management platform can select the first group of actions based on the first group of actions being stored in association with the one or more values identified as satisfying the threshold confidence level.

In some implementations, the road management platform can use a set of rules to determine the first group of actions to perform. For example, the road management platform can be configured with a set of rules that associate actions with particular ranges of parking metadata values and/or supplemental events data values, a set of rules that cause particular actions to be performed if particular parking metadata values and/or supplemental events data values are present, and/or the like. In this case, the road management platform can determine the first group of actions to perform by referencing the set of rules to identify which actions are associated with parking metadata values and/or supplemental events data values that have been received and/or obtained. As an example, a rule might indicate that a message is to be immediately generated and provided to a transit vehicle if the transit vehicle is within a threshold distance of the vehicle and is traveling adjacent to the designated parking area.

In this way, the road management platform determines the first group of actions to perform. Furthermore, by considering the supplemental events data when determining the first group of actions to perform, the road management platform conserves resources (e.g., processing resources, network resources, and/or the like) relative to an inferior platform that is unable to consider supplemental events data. For example, supplemental events data might indicate that a tram is within a threshold distance of the designated parking area, which might cause the road management platform to perform a first action (e.g., instruct a tow truck to remove the vehicle) when an inferior platform without access to the supplemental events data might generate a second action (e.g., issue a parking ticket). The second action might not prevent a collision, and might cause devices used to assist with the accident to expend processing resources and/or network resources while performing first responder duties, might cause traffic congestion to nearby vehicles (e.g., which might then waste fuel resources, expend resources using a navigational resources to identify a new route based on the traffic congestion, etc.), and/or the like.

As shown in FIG. 1C, and by reference number 135, the road management platform can, as part of the first group of actions, generate the message indicating that a portion of the vehicle is located outside of the designated parking area. As shown by reference number 140, the road management platform can provide the message to another device. As shown by reference number 145, receiving the message can cause the other device to perform a second group of actions to ensure that the vehicle does not interfere with traffic near the designated parking area and/or to penalize an owner (or a driver) for poorly parking the vehicle. Several examples of generating and providing a particular device with a particular message are provided below.

In some implementations, the road management platform can generate and provide the user device and/or the vehicle with a first message that includes the first set of instructions indicating to move the vehicle from the designated parking area. For example, the road management platform can generate and provide the user device and/or the vehicle with the first message to alert an owner of the vehicle that the vehicle needs to be moved from the designated parking area. In some cases, the first message can include further instructions indicating that the owner of the vehicle might be ticketed, or that the vehicle might be towed if the vehicle is not moved within a threshold time period. This can cause the user to manually remove the vehicle from the designated parking area, to interact with the user device to provide instructions that cause the vehicle to automatically remove itself from the designated parking area, or can cause the vehicle to automatically remove itself from the designated parking area (e.g., without instructions from the user).

Additionally, or alternatively, the road management platform can generate and provide the vehicle with a second message that includes the second set of instructions to reposition the vehicle to be appropriately parked within the designated parking area. For example, the road management platform can generate, as part of the second message, instructions indicating to reposition the vehicle, instructions indicating how to reposition the vehicle, instructions indicating a degree to which the vehicle needs to be repositioned, and/or the like. In some cases, the instructions can allow an autonomous vehicle to automatically reposition itself to be appropriately parked within the designated parking area.

Additionally, or alternatively, the road management platform can generate and provide the moving vehicle (shown as Vehicle E) with a third message that includes the third set of instructions to modify a speed or a route of the moving vehicle. This can allow the moving vehicle to avoid traveling on a part of the roadway that is adjacent to the designated parking area, to slow down to give the vehicle time to reposition itself or to be moved from the designated parking area, and/or the like. As an example, if the moving vehicle is part of an organization that contracts with an organization that manages the road management platform (e.g., a transportation or shipping organization), then the road management platform might be able to communicate with the moving vehicle to allow the moving vehicle to modify the speed or the route.

Additionally, or alternatively, the road management platform can generate and provide the third message that includes the third set of instructions to a transit vehicle, a device associated with an individual riding a bicycle, and/or the like. For example, the road management platform can provide the third message to a transit vehicle that shares the roadway with other traffic to notify the transit vehicle that the designated parking area includes a vehicle that might obstruct a path of the transit vehicle. In this case, the third message might include instructions indicating a predicted time at which a collision would occur if the vehicle remains positioned in the designated parking area, a recommended reduced speed of the transit vehicle (e.g., to give Vehicle C time to repark), an alternative path that can be taken by the transit vehicle, and/or the like. In some cases, the instructions might be based on the supplemental events data. For example, the weather data might indicate a certain amount of precipitation, which might increase a stopping time needed to stop the transit vehicle, which might decrease a recommended reduced speed that the transmit vehicle is to travel, and/or the like. A similar message can be generated and provided to the individual riding the bicycle to notify the individual of the obstruction (e.g., the similar message can be provided to a media player affixed to the individual).

Additionally, or alternatively, the road management platform can generate and provide the one or more secondary systems with a fourth message that includes the fourth set of instructions to penalize an owner (or a driver) of the vehicle for improperly parking the vehicle within the designated parking area. For example, the road management platform can generate the fourth message to include instructions indicating a current position of the vehicle, a recommended action to perform (e.g., ticket the vehicle, tow the vehicle, and/or the like), a recommended time by which to perform the recommended action, and/or the like.

Additionally, or alternatively, the road management platform can generate and provide the additional devices (e.g., the speaker, and kiosk, and/or the like) with a fifth message that includes the first or second set of instructions. For example, the road management platform can generate an audio message that can be projected near the vehicle via the speaker and/or the kiosk, can generate a text message that can be displayed via an interface of the kiosk (e.g., which, for example, an individual might view when paying for parking), and/or the like.

Additionally, or alternatively, while not shown, the road management platform can update a data stream that provides a real-time feed of the designated parking area. For example, the road management platform can update a data stream that is accessible by one or more of the secondary systems. This can allow a secondary system, such as a video management system or a towing company system, to use the real-time feed of the designated parking area to perform the second group of actions. For example, a server associated with the towing company system can display the real-time feed, and can, based on detecting that the real-time feed is indicating that the vehicle is parked outside of the designated parking area, generate and provide instructions to a tow truck to tow the vehicle from the designated parking area. As another example, a server associated with the video management system can display the real-time feed, and can, based on detecting that the real-time feed indicates that the vehicle is parked outside of the designated parking area, provide instructions to a device accessible to an individual that assigns parking tickets to permit the individual to issue the vehicle a parking ticket. In some cases, fields of an electronic parking ticket can be automatically populated based on a device associated with a secondary system receiving the message.

By performing the first group of actions, the road management platform ensures that the vehicle does not interfere or obstruct traffic near the designated parking area, thereby reducing accidents, reducing traffic congestion, and/or the like. This conserves resources (e.g., processing resources, network resources, and/or the like) of first responder devices used to provide assistance during an accident, conserves fuel by reducing the traffic congestion, and/or the like. Furthermore, penalizing the owner (or the driver) for poorly parking the vehicle reduces future accidents and/or traffic congestion by creating a deterrent that causes subsequent drivers to correctly park their vehicles in the designated parking area (e.g., or else receive a ticket or be towed).

As indicated above, FIGS. 1A-1C are provided merely as an example. Other examples are possible and can differ from what was described with regard to FIGS. 1A-1C. For example, there can be additional devices and/or networks, fewer devices and/or networks, different devices and/or networks, or differently arranged devices and/or networks than those shown in FIGS. 1A-1C. Furthermore, two or more devices shown in FIGS. 1A-1C can be implemented within a single device, or a single device shown in FIGS. 1A-1C can be implemented as multiple, distributed devices. Additionally, or alternatively, a set of devices (e.g., one or more devices) of example implementation 100 can perform one or more functions described as being performed by another set of devices of example implementation 100.

Figure 2:
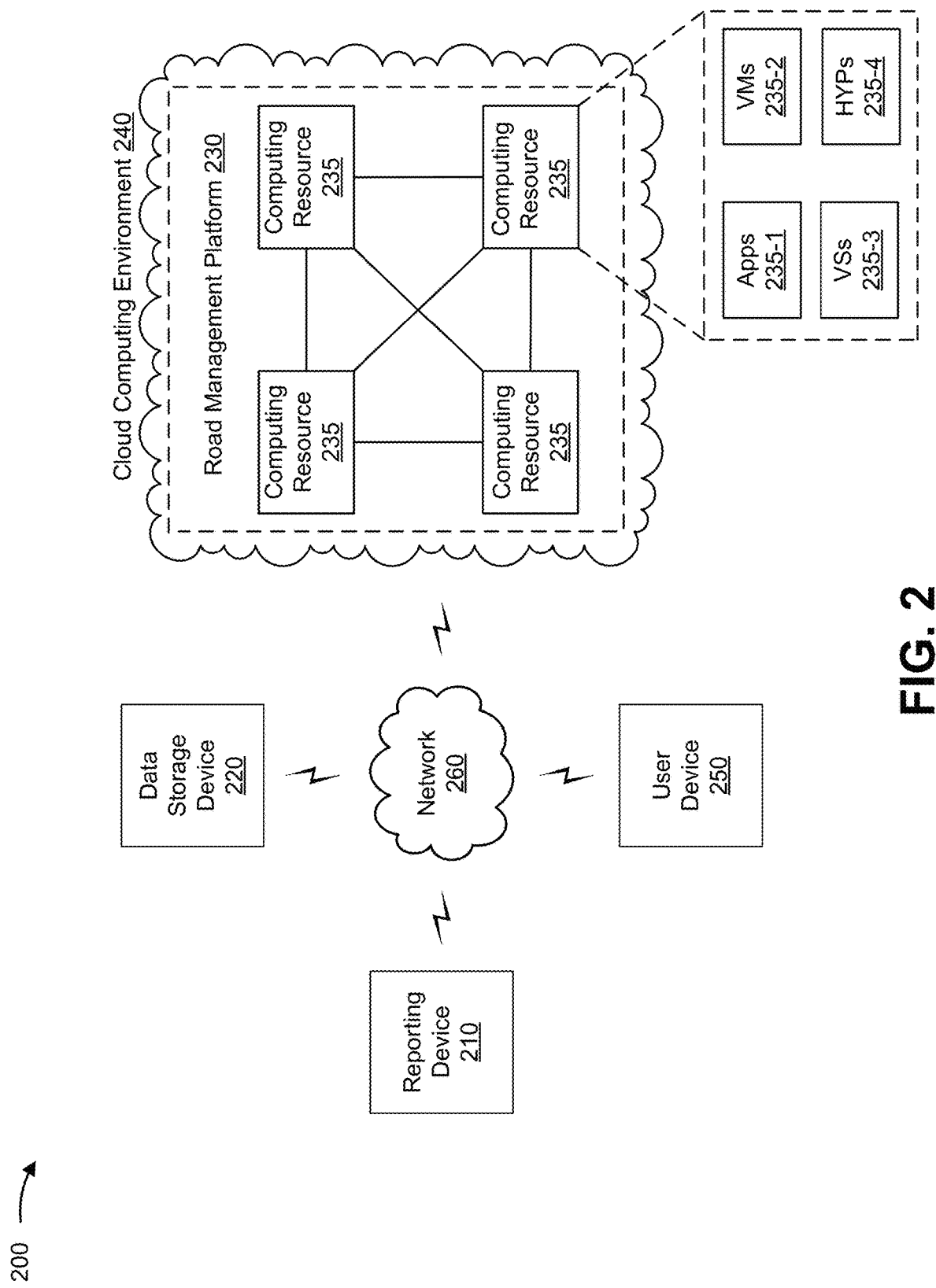
FIG. 2 is a diagram of an example environment in which systems and/or methods, described herein, can be implemented.

FIG. 2 is a diagram of an example environment 200 in which systems and/or methods, described herein, can be implemented. As shown in FIG. 2, environment 200 can include a reporting device 210, a data storage device 220, a road management platform 230 hosted within a cloud computing environment 240, a user device 250, and/or a network 260. Devices of environment 200 can interconnect via wired connections, wireless connections, or a combination of wired and wireless connections.

Reporting device 210 includes one or more device capable of obtaining, storing, and/or providing information associated with a designated parking area. In some implementations, reporting device 210 can be a device with a sensor that is capable of detecting objects, motion, weather, and/or the like, a vehicle (e.g., a car, a truck, a plane, a drone, an autonomous vehicle, and/or the like), a user device (e.g., a communication device, such as a mobile phone), and/or the like. For example, reporting device 210 can include a camera (e.g., a visual spectrum imaging camera, an infrared or near infrared imaging camera, a multi spectral imaging camera, a hyperspectral imaging camera, a thermal imaging camera, a laser mapping imagery camera, a camera capable of detecting vehicles in a designated parking area, etc.), a speed detecting device, and/or the like.

In some implementations, reporting device 210 can monitor a designated parking area to obtain parking metadata. In some implementations, reporting device 210 can include a sensor capable of obtaining parking metadata of a vehicle that is accurate within at least 30 centimeters of an actual location of the vehicle. In some implementations, reporting device 210 can receive configuration information from road management platform 230 or another device. In some implementations, reporting device 210 can provide parking metadata to road management platform 230 and/or data storage device 220.

Data storage device 220 includes one or more devices capable of receiving, storing, generating, determining, and/or providing information associated with one or more sets of designated parking areas. For example, data storage device 220 can include a server device or a group of server devices. In some implementations, data storage device 220 can store supplemental events data. In some implementations, data storage device 220 can provide supplemental events data to road management platform 230. In some implementations, a first data storage device 220 can store and/or provide scheduling data identifying a location of a transit vehicle to road management platform 230. Additionally, or alternatively, a second data storage device 220 can store and/or provide traffic data identifying traffic in a bicycle line or roadway to road management platform 230. Additionally, or alternatively, a third data storage device 220 can store and/or provide weather data identifying a weather condition near the designated parking area to road management platform 230.

Road management platform 230 includes one or more devices capable of receiving, storing, generating, determining, and/or providing information associated with a designated parking area. For example, road management platform 230 can include a server device (e.g., a host server, a web server, an application server, etc.), a data center device, or a similar device. In some implementations, road management platform 230 can provide configuration information to reporting device 210. In some implementations, road management platform 230 can support a program (e.g., a website, a mobile application, and/or the like) that allows a user to interact with an interface to input configuration information for reporting device 210. In some implementations, road management platform 230 can perform a first group of actions that include interacting with one or more other devices to cause the one or more other devices to perform a second group of actions that improve vehicle positioning or safety within a designated parking area. The one or more other devices can include reporting device 210, user device 250, a vehicle in a designated parking area, a moving vehicle outside of the designated parking area, a secondary system (e.g., a video management system, a towing company system, and/or the like), a speaker, a kiosk, and/or the like.

In some implementations, as shown, road management platform 230 can be hosted in cloud computing environment 240. Notably, while implementations described herein describe road management platform 230 as being hosted in cloud computing environment 240, in some implementations, road management platform 230 might not be cloud-based (i.e., can be implemented outside of a cloud computing environment) or can be partially cloud-based.

Cloud computing environment 240 includes an environment that hosts road management platform 230. Cloud computing environment 240 can provide computation, software, data access, storage, etc. services that do not require end-user knowledge of a physical location and configuration of system(s) and/or device(s) that hosts road management platform 230. As shown, cloud computing environment 240 can include a group of computing resources 235 (referred to collectively as "computing resources 235" and individually as "computing resource 235").

Computing resource 235 includes one or more personal computers, workstation computers, server devices, or another type of computation and/or communication device. In some implementations, computing resource 235 can host road management platform 230. The cloud resources can include compute instances executing in computing resource 235, storage devices provided in computing resource 235, data transfer devices provided by computing resource 235, and/or the like. In some implementations, computing resource 235 can communicate with other computing resources 235 via wired connections, wireless connections, or a combination of wired and wireless connections.

As further shown in FIG. 2, computing resource 235 can include a group of cloud resources, such as one or more applications ("APPs") 235-1, one or more virtual machines ("VMs") 235-2, virtualized storage ("VSs") 235-3, one or more hypervisors ("HYPs") 235-4, and/or the like.

Application 235-1 can include one or more software applications that can be provided to or accessed by reporting device 210, data storage device 220, and/or user device 250. Application 235-1 can eliminate a need to install and execute the software applications on these devices. For example, application 235-1 can include software associated with road management platform 230 and/or any other software capable of being provided via cloud computing environment 240. In some implementations, one application 235-1 can send/receive information to/from one or more other applications 235-1, via virtual machine 235-2.

Virtual machine 235-2 can include a software implementation of a machine (e.g., a computer) that executes programs like a physical machine. Virtual machine 235-2 can be either a system virtual machine or a process virtual machine, depending upon use and degree of correspondence to any real machine by virtual machine 235-2. A system virtual machine can provide a complete system platform that supports execution of a complete operating system ("OS"). A process virtual machine can execute a single program and can support a single process. In some implementations, virtual machine 235-2 can execute on behalf of another device (e.g., reporting device 210, data storage device 220, user device 250, etc.), and can manage infrastructure of cloud computing environment 240, such as data management, synchronization, or long-duration data transfers.

Virtualized storage 235-3 can include one or more storage systems and/or one or more devices that use virtualization techniques within the storage systems or devices of computing resource 235. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 235-4 can provide hardware virtualization techniques that allow multiple operating systems (e.g., "guest operating systems") to execute concurrently on a host computer, such as computing resource 235. Hypervisor 235-4 can present a virtual operating platform to the guest operating systems and can manage the execution of the guest operating systems. Multiple instances of a variety of operating systems can share virtualized hardware resources.

User device 250 includes one or more devices capable of receiving, generating, storing, processing, and/or providing information associated with a designated parking area. For example, user device 250 can include a communication and/or computing device, such as a mobile phone (e.g., a smart phone, a radiotelephone, etc.), a laptop computer, a tablet computer, a handheld computer, a server computer, a gaming device, a wearable communication device (e.g., a smart wristwatch, a pair of smart eyeglasses, etc.), or a similar type of device. In some implementations, user device 250 can be a device of an owner of a vehicle (or driver of the vehicle) that is within the designated parking area or that is traveling through a roadway using a path that is obstructed by another vehicle that is within the designated parking area.

Network 260 includes one or more wired and/or wireless networks. For example, network 260 can include a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
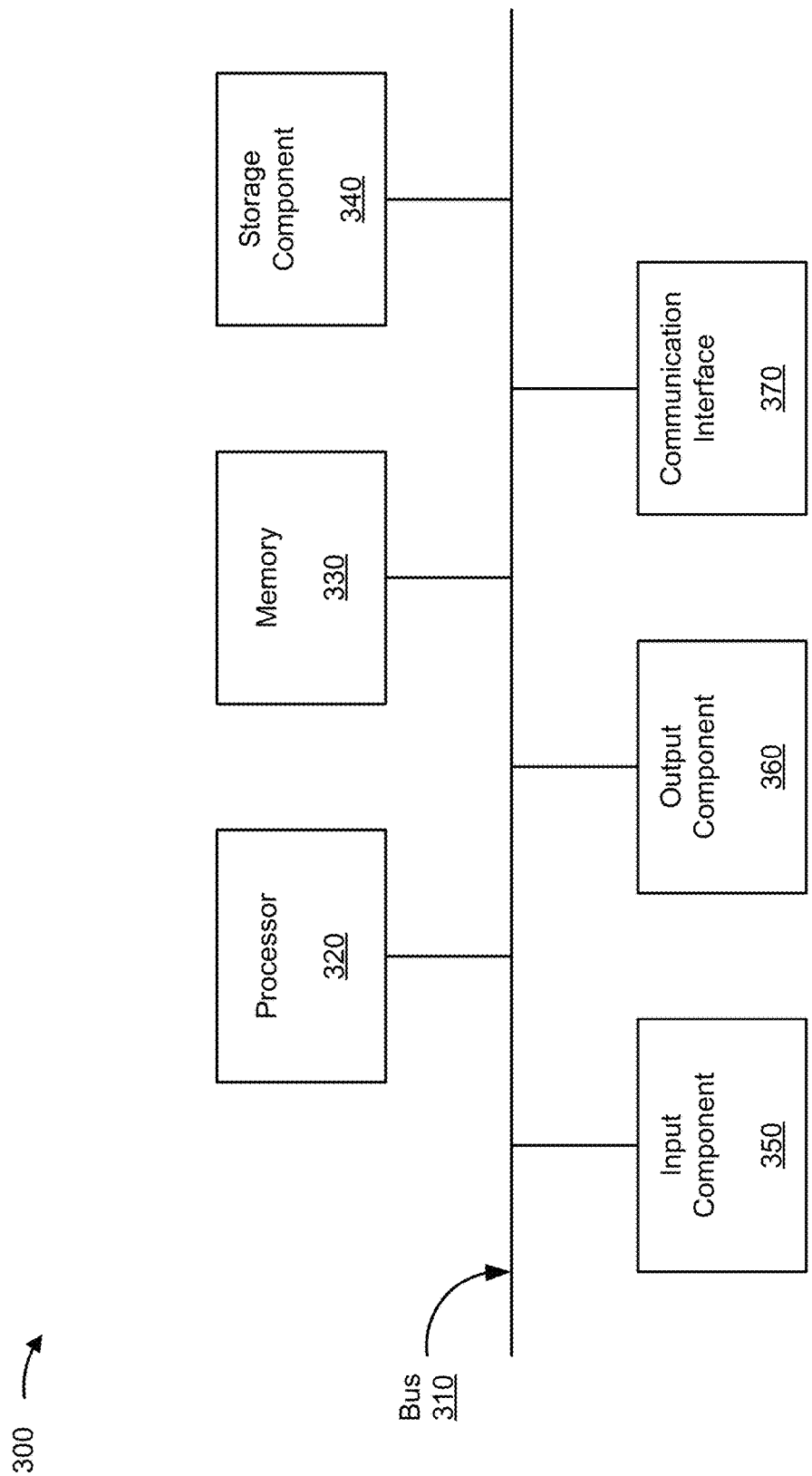
FIG. 3 is a diagram of example components of one or more devices of FIG. 2.

FIG. 3 is a diagram of example components of a device 300. Device 300 can correspond to reporting device 210, data storage device 220, road management platform 230, and/or user device 250. In some implementations, reporting device 210, data storage device 220, road management platform 230, and/or user device 250 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a wireless local area network interface, a cellular network interface, or the like.

Device 300 can perform one or more processes described herein. Device 300 can perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
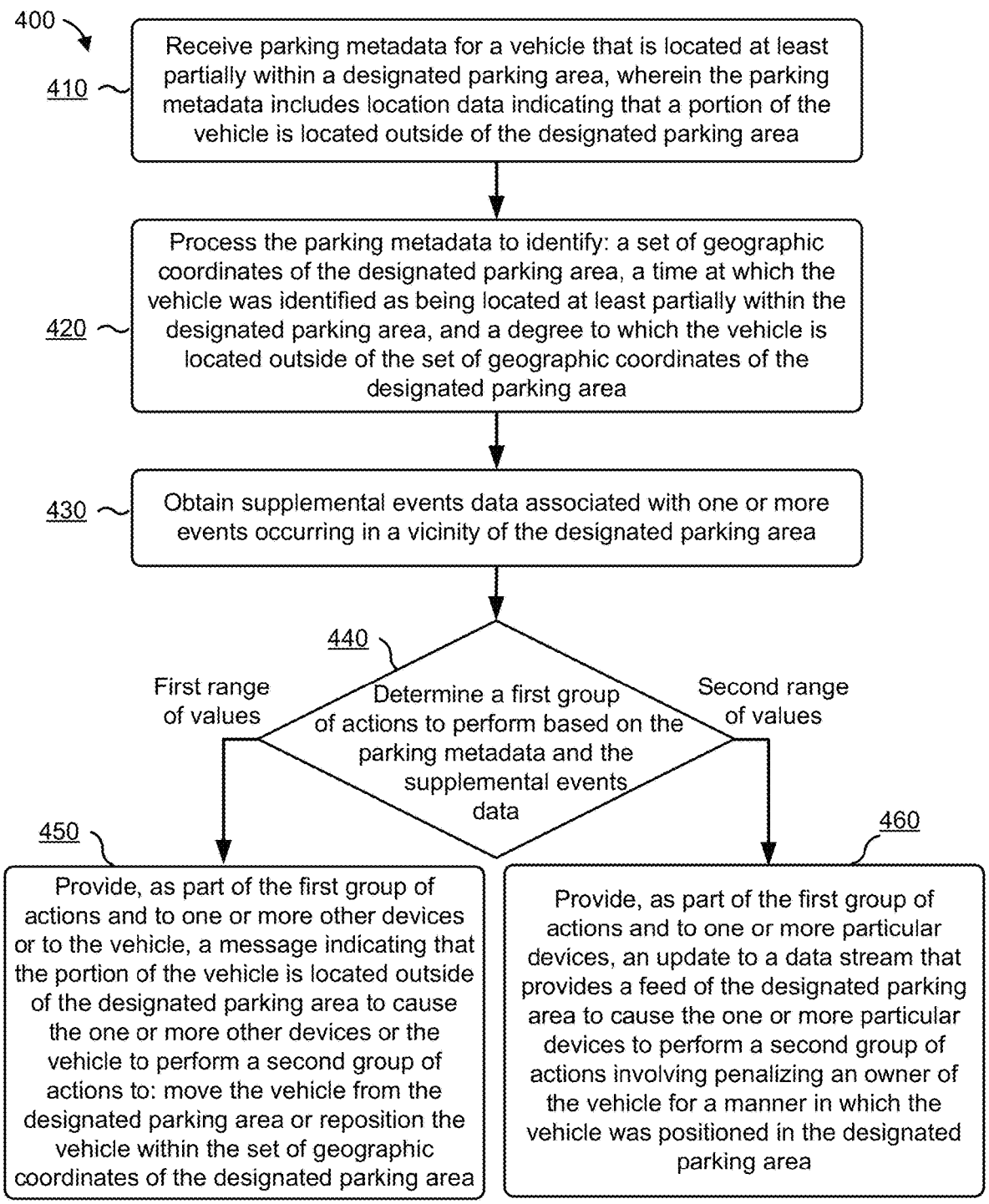
FIG. 4 is a flow chart of an example process for identifying a vehicle in a designated parking area as being poorly parked and performing actions for ensuring that the vehicle does not interfere with traffic near the designated parking area and/or actions for penalizing an owner (or a driver) for poorly parking the vehicle.

FIG. 4 is a flow chart of an example process 400 for identifying a vehicle in a designated parking area as being poorly parked and performing actions for ensuring that the vehicle does not interfere with traffic near the designated parking area and/or actions for penalizing an owner (or a driver) for poorly parking the vehicle. In some implementations, one or more process blocks of FIG. 4 can be performed by a road management platform (e.g., road management platform 230). In some implementations, one or more process blocks of FIG. 4 can be performed by another device or a group of devices separate from or including the road management platform, such as a reporting device (e.g., reporting device 210), a data storage device (e.g., data storage device 220), and/or a user device (e.g., user device 250).

As shown in FIG. 4, process 400 can include receiving parking metadata for a vehicle that is located at least partially within a designated parking area, wherein the parking metadata includes location data indicating that a portion of the vehicle is located outside of the designated parking area (block 410). For example, the road management platform (e.g., road management platform 230, using computing resource 235, processor 320, memory 330, input component 350, communication interface 370, etc.) can receive parking metadata for a vehicle that is located at least partially within a designated parking area, as described above with regard to FIGS. 1A-1C. In some implementations, the parking metadata can include location data indicating that a portion of the vehicle is located outside of the designated parking area.

As further shown in FIG. 4, process 400 can include processing the parking metadata to identify: a set of geographic coordinates of the designated parking area, a time at which the vehicle was identified as being located at least partially within the designated parking area, and a degree to which the vehicle is located outside of the set of geographic coordinates of the designated parking area (block 420). For example, the road management platform (e.g., road management platform 230, using computing resource 235, processor 320, memory 330, etc.) can process the parking metadata to identify: a set of geographic coordinates of the designated parking area, a time at which the vehicle was identified as being located at least partially within the designated parking area, and a degree to which the vehicle is located outside of the set of geographic coordinates of the designated parking area, as described above with regard to FIGS. 1A-1C.

As further shown in FIG. 4, process 400 can include obtaining supplemental events data associated with one or more events occurring in a vicinity of the designated parking area (block 430). For example, the road management platform (e.g., road management platform 230, using computing resource 235, processor 320, memory 330, input component 350, output component 360, communication interface 370, etc.) can obtain supplemental events data associated with one or more events occurring in a vicinity of the designated parking area, as described above with regard to FIGS. 1A-1C.

As further shown in FIG. 4, process 400 can include determining a first group of actions to perform based on the parking metadata and the supplemental events data (block 440). For example, the road management platform (e.g., road management platform 230, using computing resource 235, processor 320, memory 330, input component 350, output component 360, communication interface 370, etc.) can determine a first group of actions to perform based on the parking metadata and the supplemental events data, as described above with regard to FIGS. 1A-1C.

As further shown in FIG. 4, if the road management platform identifies parking metadata values and supplemental events data values that are within a first range of values, process 400 can include providing, as part of the first group of actions and to one or more other devices or to the vehicle, a message indicating that the portion of the vehicle is located outside of the designated parking area to cause the one or more other devices or the vehicle to perform a second group of actions to: move the vehicle from the designated parking area or reposition the vehicle within the set of geographic coordinates of the designated parking area (block 450). For example, the road management platform (e.g., road management platform 230, using computing resource 235, processor 320, memory 330, output component 360, communication interface 370, etc.) can provide, as part of the first group of actions and to one or more other devices or to the vehicle, a message indicating that the portion of the vehicle is located outside of the designated parking area to cause the one or more other devices or the vehicle to perform a second group of actions to: move the vehicle from the designated parking area or reposition the vehicle within the set of geographic coordinates of the designated parking area, as described above with regard to FIGS. 1A-1C.

As further shown in FIG. 4, if the road management platform identifies parking metadata values and supplemental events data values that are within a second range of values, process 400 can include providing, as part of the first group of actions and to one or more particular devices, an update to a data stream that provides a feed of the designated parking area to cause the one or more particular devices to perform a second group of actions involving penalizing the owner of the vehicle for a manner in which the vehicle was positioned in the designated parking area (block 460). For example, the road management platform (e.g., road management platform 230, using computing resource 235, processor 320, memory 330, input component 350, output component 360, communication interface 370, etc.) can provide, as part of the first group of actions and to one or more particular devices, an update to a data stream that provides a feed of the designated parking area to cause the one or more particular devices to perform a second group of actions involving penalizing the owner of the vehicle for a manner in which the vehicle was positioned in the designated parking area, as described above with regard to FIGS. 1A-1C.

Process 400 can include additional implementations, such as any single implementation or any combination of implementations described below and/or in connection with one or more other processes described elsewhere herein.

In some implementations, the road management platform, when receiving the parking metadata, can receive the parking metadata from a sensor device that is configured to determine the location data in a manner that is accurate within at least 30 centimeters of an actual location of the vehicle. In some implementations, the supplemental events data can include scheduling data identifying a location of a particular vehicle that is part of a transit service that runs adjacent to the designated parking area, traffic data identifying traffic associated with a bicycle lane or a roadway that is adjacent to the designated parking area, weather data identifying a weather condition at the designated parking area, and/or the like.

In some implementations, the road management platform, when determining the first group of actions that are to be performed, can provide the parking metadata and the supplemental events data as input to a data model to cause the data model to output a set of values that are to be used to score a third group of actions that include the first group of actions. In some implementations, the road management platform can determine that one or more values, of the set of values, satisfy a confidence threshold. The one or more values can be associated with the first group of actions. In some implementations, the road management platform can determine the first group of actions that are to be performed based on determining that the one or more values satisfy the confidence threshold.

In some implementations, the road management platform, when performing the first group of actions, can generate the message indicating that the portion of the vehicle is located outside of the designated parking area. The message can include instructions indicating to modify a speed or a route of a particular vehicle to avoid a collision with the vehicle. The route the particular vehicle is expected to travel can be adjacent to the designated parking area. In some implementations, the road management platform can provide the message to the particular vehicle to cause the particular vehicle to modify the speed or the route to avoid the collision with the vehicle.

In some implementations, the road management platform, when performing the first group of actions, can generate the message indicating that the portion of the vehicle is located outside of the designated parking area. The message can include instructions to move the vehicle within or from the designated parking area. In some implementations, the road management platform can provide the message to the vehicle or to the user device associated with the vehicle (e.g., user device 250) to cause the vehicle to move within the designated parking area or to be moved from the designated parking area.

In some implementations, the message can include a first set of instructions to move the vehicle from the designated parking area, a second set of instructions to reposition the vehicle within the designated parking area, a third set of instructions to modify a speed or a route of a particular vehicle that is expected to travel adjacent to the designated parking area to assist the particular vehicle in avoiding a collision with the vehicle, a fourth set of instructions to penalize the owner of the vehicle for the manner in which the vehicle was positioned in the designated parking area, a fifth set of instructions to display or project a notification indicating that the vehicle has to be moved within the designated parking area or moved from the designated parking area, and/or the like.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations are possible in light of the above disclosure or can be acquired from practice of the implementations.

As used herein, the term component is intended to be broadly construed as hardware, firmware, or a combination of hardware and software.

Some implementations are described herein in connection with thresholds. As used herein, satisfying a threshold can refer to a value being greater than the threshold, more than the threshold, higher than the threshold, greater than or equal to the threshold, less than the threshold, fewer than the threshold, lower than the threshold, less than or equal to the threshold, equal to the threshold, or the like.

To the extent the aforementioned embodiments collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, can be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features can be combined in ways not specifically recited in the claims and/or disclosed in the specification. Although each dependent claim listed below can directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a first device, parking metadata for a vehicle that is located at least partially within a designated parking area,
        wherein the parking metadata includes location data indicating that a portion of the vehicle is located outside of the designated parking area; processing, by the first device, the parking metadata to identify:
            a set of geographic coordinates of the designated parking area,
            a time at which the vehicle was identified as being located at least partially within the designated parking area, and
            a degree to which the vehicle is located outside of the set of geographic coordinates of the designated parking area;
    obtaining, by the first device, supplemental events data associated with one or more events occurring in a vicinity of the designated parking area;
    determining, by the first device, a first group of actions that are to be performed based on the parking metadata and the supplemental events data,
        wherein determining the first group of actions that are to be performed comprises:
            determining that one or more values, of a set of values, satisfy a confidence threshold,
                wherein the set of values are received from a data model based on the parking metadata and the supplemental events data being processed by the data model, and
                wherein the one or more values are associated with the first group of actions, and
            determining the first group of actions that are to be performed based on determining that the one or more values satisfy the confidence threshold, and
        wherein the first group of actions include a first action to provide, to one or more other devices or to the vehicle, a message indicating that the portion of the vehicle is located outside of the designated parking area; and
    performing, by the first device, the first group of actions to cause the one or more other devices or the vehicle to perform a second group of actions to:
        move the vehicle from the designated parking area,
        reposition the vehicle within the set of geographic coordinates of the designated parking area, or
        penalize an owner of the vehicle for a manner in which the vehicle was positioned in the designated parking area.

2. The method of claim 1, wherein receiving the parking metadata comprises:
    receiving the parking metadata from a sensor device that is configured to determine the location data in a manner that is accurate within at least 30 centimeters of an actual location of the vehicle.

3. The method of claim 1, wherein the supplemental events data includes at least one of:
    scheduling data identifying a location of a particular vehicle that is part of a transit service that runs adjacent to the designated parking area,
    traffic data identifying traffic associated with a bicycle lane or a roadway that is adjacent to the designated parking area, or
    weather data identifying a weather condition at the designated parking area.

4. The method of claim 1, wherein performing the first group of actions comprises:
    generating the message indicating that the portion of the vehicle is located outside of the designated parking area,
        wherein the message includes instructions indicating to modify a speed or a route of a particular vehicle to avoid a collision with the vehicle, and
        wherein the route the particular vehicle is expected to travel is adjacent to the designated parking area, and
    providing the message to the particular vehicle to cause the particular vehicle to modify the speed or the route to avoid the collision with the vehicle.

5. The method of claim 1, wherein performing the first group of actions comprises:
    generating the message indicating that the portion of the vehicle is located outside of the designated parking area, wherein the message includes instructions to move the vehicle within or from the designated parking area, and providing the message to the vehicle or to a user device associated with the vehicle to cause the vehicle to move within the designated parking area or to be moved from the designated parking area.

6. The method of claim 1, wherein the message includes at least one of:
a first set of instructions to move the vehicle from the designated parking area,
a second set of instructions to reposition the vehicle within the designated parking area,
a third set of instructions to modify a speed or a route of a particular vehicle that is expected to travel adjacent to the designated parking area to assist the particular vehicle in avoiding a collision with the vehicle,
a fourth set of instructions to penalize the owner of the vehicle for the manner in which the vehicle was positioned in the designated parking area, or
a fifth set of instructions to display or project a notification indicating that the vehicle has to be moved within the designated parking area or moved from the designated parking area.

7. A first device, comprising:
one or more memories; and
one or more processors, to:
receive parking metadata for a vehicle that is located at least partially within a designated parking area,
wherein the parking metadata includes location data indicating that a portion of the vehicle is located outside of the designated parking area; process the parking metadata to identify:
a set of geographic coordinates of the designated parking area,
a time at which the vehicle was identified as being located at least partially within the designated parking area, and
a degree to which the vehicle is located outside of the set of geographic coordinates of the designated parking area;
obtain supplemental events data associated with one or more events occurring in a vicinity of the designated parking area,
wherein the supplemental events data includes at least one of:
schedule data identifying a location of a particular vehicle that is part of a transit service that runs adjacent to the designated parking area,
traffic data identifying traffic associated with a bicycle lane or a roadway that is adjacent to the designated parking area, or
weather data identifying a weather condition at the designated parking area;
determine a first group of actions that are to be performed based on the parking metadata and the supplemental events data,
wherein the first group of actions include a first action to provide, to one or more other devices or to the vehicle, a message indicating that the portion of the vehicle is located outside of the designated parking area; and
perform the first group of actions to cause the one or more other devices or the vehicle to perform a second group of actions to:
move the vehicle from the designated parking area,
reposition the vehicle within the designated parking area, or
penalize an owner of the vehicle for a manner in which the vehicle was positioned in the designated parking area.

8. The first device of claim 7, wherein the one or more processors, when receiving the parking metadata, are to:
receive the parking metadata from a sensor device that is configured to determine the location data in a manner that is accurate within at least 30 centimeters of an actual location of the vehicle.

9. The first device of claim 7, wherein the one or more processors, when determining the first group of actions that are to be performed, are to:
provide the parking metadata and the supplemental events data as input to a data model to cause the data model to output a set of values,
determine that one or more values, of the set of values, satisfy a confidence threshold,
wherein the one or more values are associated with the first group of actions, and
determine the first group of actions that are to be performed based on determining that the one or more values satisfy the confidence threshold.

10. The first device of claim 7, wherein the one or more processors, when performing the first group of actions, are to:
generate the message indicating that the portion of the vehicle is located outside of the designated parking area,
wherein the message includes instructions indicating to modify a speed or a route of a particular vehicle to avoid a collision with the vehicle, and
wherein the route the particular vehicle is expected to travel is adjacent to the designated parking area, and
provide the message to the particular vehicle to cause the particular vehicle to modify the speed or the route to avoid the collision with the vehicle.

11. The first device of claim 7, wherein the one or more processors, when performing the first group of actions, are to:
generate the message indicating that the portion of the vehicle is located outside of the designated parking area,
wherein the message includes instructions to move the vehicle within or from the designated parking area, and
provide the message to the vehicle or to a user device associated with the vehicle to cause the vehicle to move within the designated parking area or to be moved from the designated parking area.

12. The first device of claim 7, wherein the message includes at least one of:
a first set of instructions to move the vehicle from the designated parking area,
a second set of instructions to reposition the vehicle within the designated parking area,
a third set of instructions to modify a speed or a route of a particular vehicle that is expected to travel adjacent to the designated parking area to assist the particular vehicle in avoiding a collision with the vehicle,
a fourth set of instructions to penalize the owner of the vehicle for the manner in which the vehicle was positioned in the designated parking area, or a fifth set of instructions to display or project a notification indicating that the vehicle has to be moved within the designated parking area or moved from the designated parking area.

13. A non-transitory computer-readable medium storing one or more instructions, the one or more instructions comprising:
one or more instructions that, when executed by one or more processors of a first device, cause the one or more processors to:
receive parking metadata for a vehicle that is located at least partially within a designated parking area,
wherein the parking metadata includes location data indicating that a portion of the vehicle is located outside of the designated parking area; process the parking metadata to identify:
a set of geographic coordinates of the designated parking area,
a time at which the vehicle was identified as being located at least partially within the designated parking area, and
a degree to which the vehicle is located outside of the set of geographic coordinates of the designated parking area;
obtain supplemental events data associated with one or more events occurring in a vicinity of the designated parking area;
determine a first group of actions that are to be performed based on the parking metadata and the supplemental events data,
wherein the one or more instructions, that cause the one or more processors to determine the first group of actions that are to be performed, cause the one or more processors to:
determine that one or more values, of a set of values, satisfy a confidence threshold,
wherein the set of values are received from a data model based on the parking metadata and the supplemental events data being processed by the data model, and
wherein the one or more values are associated with the first group of actions, and
determine the first group of actions that are to be performed based on determining that the one or more values satisfy the confidence threshold, and
wherein the first group of actions include a first action to provide, to one or more other devices or to the vehicle, a message indicating that the portion of the vehicle is located outside of the designated parking area; and
perform the first group of actions to cause the one or more other devices or the vehicle to perform a second group of actions to:
move the vehicle from the designated parking area,
reposition the vehicle within the designated parking area, or
penalize an owner of the vehicle for a manner in which the vehicle was positioned in the designated parking area.

14. The non-transitory computer-readable medium of claim 13, wherein the one or more instructions, that cause the one or more processors to receive the parking metadata, cause the one or more processors to:
receive the parking metadata from a sensor device that is configured to determine the location data in a manner that is accurate within at least 30 centimeters of an actual location of the vehicle.

15. The non-transitory computer-readable medium of claim 13, wherein the supplemental events data includes at least one of:
schedule data identifying a location of a particular vehicle that is part of a transit service that runs adjacent to the designated parking area,
traffic data identifying traffic associated with a bicycle lane or a roadway that is adjacent to the designated parking area, or
weather data identifying a weather condition at the designated parking area.

16. The non-transitory computer-readable medium of claim 13, wherein the one or more instructions, that cause the one or more processors to perform the first group of actions, cause the one or more processors to:
generate the message indicating that the portion of the vehicle is located outside of the designated parking area,
wherein the message includes instructions to move the vehicle within or from the designated parking area, and
provide the message to the vehicle or to a user device associated with the vehicle to cause the vehicle to move within the designated parking area or to be moved from the designated parking area.

17. The non-transitory computer-readable medium of claim 13, wherein the message includes at least one of:
a first set of instructions to move the vehicle from the designated parking area,
a second set of instructions to reposition the vehicle within the designated parking area,
a third set of instructions to modify a speed or a route of a particular vehicle that is expected to travel adjacent to the designated parking area to assist the particular vehicle in avoiding a collision with the vehicle,
a fourth set of instructions to penalize the owner of the vehicle for the manner in which the vehicle was positioned in the designated parking area, or
a fifth set of instructions to display or project a notification indicating that the vehicle has to be moved within the designated parking area or moved from the designated parking area.

18. The method of claim 1, wherein the supplemental events data determined using a data mining technique.

19. The first device of claim 7, wherein the message includes a first set of instructions to allow an autonomous vehicle to automatically reposition itself to be parked within the designated parking area.

20. The non-transitory computer-readable medium of claim 13, wherein the supplemental events data determined using a data mining technique.

* * * * *